J. H. REED.
PENMANSHIP CHART.
APPLICATION FILED SEPT. 30, 1914.
1,145,512.
Patented July 6, 1915.
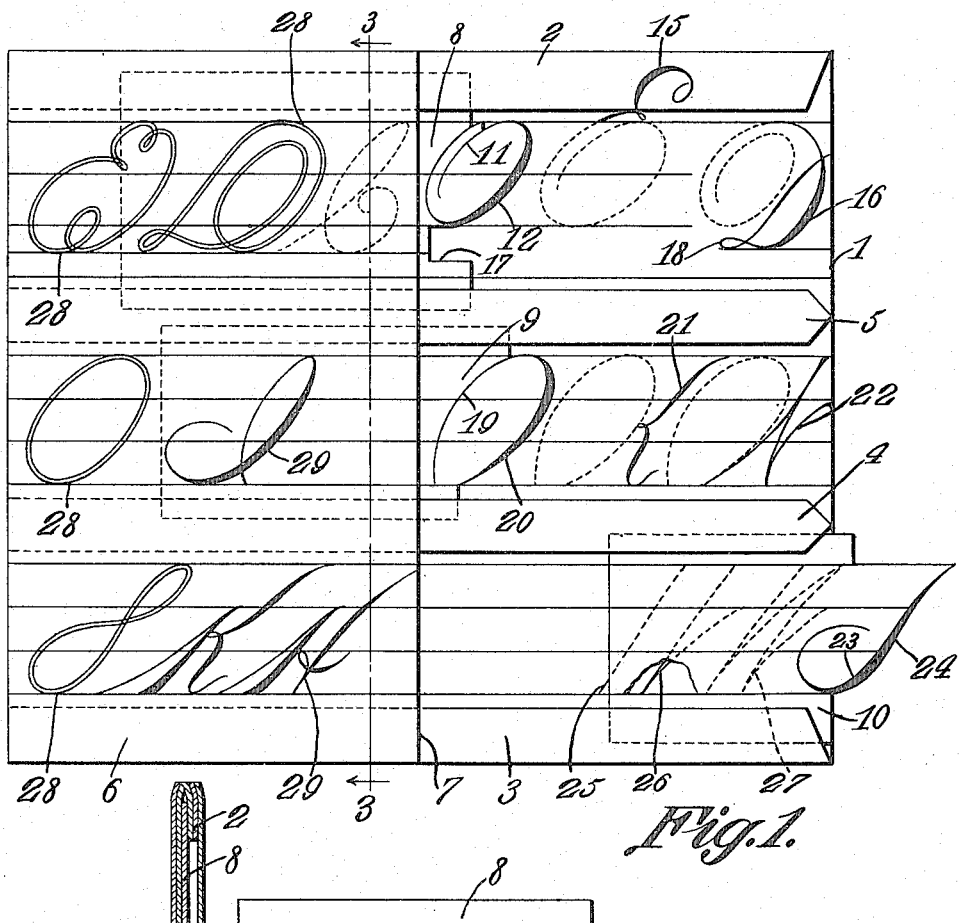
Fig. 1.
Fig. 2.
Fig. 3.
Witnesses
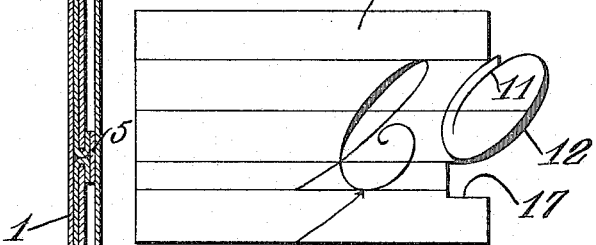
John H. Reed, Inventor
by
Attorneys

UNITED STATES PATENT OFFICE.

JOHN HENRY REED, OF LANCASTER, WISCONSIN.

PENMANSHIP-CHART.

1,145,512.   Specification of Letters Patent.   Patented July 6, 1915.

Application filed September 30, 1914. Serial No. 864,281.

*To all whom it may concern:*

Be it known that I, JOHN H. REED, a citizen of the United States, residing at Lancaster, in the county of Grant and State of Wisconsin, have invented a new and useful Penmanship-Chart, of which the following is a specification.

The object of this invention is to provide a device which may be employed, even in the hands of a person unskilled in penmanship, for instructing another unskilled person.

The device, further, is adapted for self-instruction in the art above mentioned.

Specifically, the invention aims to provide a structure of the sort above mentioned embodying a movable member carrying a line or element, the movable member being adapted to be advanced so that the line or element may come successively into close relation to various letters of the alphabet or other characters, thereby illustrating that the line or element on the movable member constitutes a component part of a plurality of letters or characters.

Further, the invention aims to improve structurally, a device in which the above mentioned ends are carried out.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings: Figure 1 shows the invention in plan, parts being broken away; Fig. 2 is a plan showing one of the slides; Fig. 3 is a section on the line 3—3 of Fig. 1.

The penmanship chart forming the subject matter of this application comprises a body including a back plate 1 carrying edge guides 2 and 3 and intermediate guides 4 and 5. Superposed upon the guides 2, 3, 4, and 5, and secured thereto is a face plate 6. The face plate 6 terminates as shown at 7, intermediate the ends of the back plate 1.

Mounted to reciprocate longitudinally of the back plate 1 in the guides 2 and 5 is a slide 8, a second slide 9 coöperating in a similar manner with the guides 5 and 4, and a third slide 10 being mounted in the guides 4 and 3. In general, any desired number of slides may be provided. Inscribed upon the slide 8 adjacent one end thereof is a letter 11, the letter O being selected by way of illustration. The end of the slide 8 is cut as shown at 12, to form a part of the periphery of the letter O shown at 11. Upon the back plate 1 and if necessary extended onto the edge guide 2 is the capital letter E, indicated at 15. Inscribed upon the back plate 1 as shown at 16 is the letter D.

It will now be understood that when the slide 8 is advanced, the letter O, shown at 11, and particularly the edge 12 of the slide 8 coöperates with the letters shown at 15 and 16 to complete the same, thereby indicating that the letter O and the edge 12 of the slide 8 constitute a principal or element which enters into the construction of other letters of the alphabet. Preferably, as shown in the drawings, those portions of the letters 15 and 16 which are replaced by the letter O shown at 11, or by the curved edge 12 of the plate 8 are dotted, the remaining portions of the letters being in solid line. If desired, the slide 8 may be cut away as shown at 17 to clear the bottom loop 18 of the letter 16. Upon the slide 8 to the left of the character 11 may be inscribed other characters of which the letter 11 constitutes an element, wholly or in part. One of the letters thus inscribed on the slide 8 is indicated at 14 and it will be understood that as many letters as desired may be placed upon the slide. In the foregoing description and in the following descriptions, it will of course be understood that specific letters are mentioned merely by way of illustration. Upon the slide 9 may be inscribed a curve or principal 19, one edge 20 of the slide being cut away to form a part of the curve of the principal. The curve or principal 19 and the edge 20 of the slide 9 coöperate with such letters as K, shown at 21, and W, shown at 22, the letters last above mentioned being inscribed on the back plate 1 and being partly dotted and partly solid as hereinbefore described. Inscribed on the slide 10 is a curve or principal 23, and the end edge of the slide 10 is cut away as shown at 24, to correspond to the principal. The elements 23 and 24 may coöperate with partially finished letters 25, 26 and 27 on the back plate 1. Thus, the elements 23, 24, and 25 form a part of the letter A, the elements 23, 24 and 26 will form the letter N, and the elements 23, 24 and 27 will from the letter M. On the exposed surface of the face plate 6 may be inscribed movement exercises 28 and letters 29 corresponding more or less to the principals on the respective slides. When the slides are not in use, the same may be slid into out of the way positions beneath the face plate 6.

Having thus described the invention, what is claised is:—

1. A penmanship chart comprising a body having a plurality of characters thereon and comprising like elements; and a single member movable on the body toward and away from the characters, the movable member being provided with a line which duplicates said elements and is adapted to represent said elements in all of the characters.

2. A penmanship chart embodying a body having a character forming line inscribed thereon; and a member movable on the body toward and away from the character forming line, one edge of the movable member being shaped to coöperate with the character forming line.

3. A penmanship chart comprising a body having a character inscribed thereon; and a member movable on the body toward and away from the character, the movable member being provided with a line which constitutes a part of the character; that part of the character which corresponds to the line being dotted and the remaining portions of the character being in solid line.

4. A penmanship chart comprising a back plate and guides; a face plate mounted on the guides and extended part way across the back plate; and a slide mounted to reciprocate in the guides and adapted to retire beneath the face plate, the back plate being provided with a character forming line and one end of the slide being cut away and shaped to coöperate with the character forming line.

5. A penmanship chart comprising a body having a character thereon; and a member movable on the body toward and away from the character, the movable member being provided with a line which constitutes a part of the character, that part of the character which corresponds to the line and the remaining portions of the character being inscribed in different ways.

In testimony that I claim the foregoing as my own, I have hereto affixed my signature in the presence of two witnesses.

JOHN HENRY REED.

Witnesses:
L. K. GARNER,
CHAS. MAYNE.